US008340080B2

(12) United States Patent
Huang et al.

(10) Patent No.: US 8,340,080 B2
(45) Date of Patent: Dec. 25, 2012

(54) SYSTEM, METHOD, AND RECORDING MEDIUM FOR SCHEDULING PACKETS TO BE TRANSMITTED

(75) Inventors: Ching-Yao Huang, Hsinchu (TW); Chan-jui Chian, Taipei (TW); Youn-Tai Lee, Taipei County (TW); Yi-Ting Lin, Taipei County (TW)

(73) Assignee: Institute For Information Industry, Taipei (TW)

( * ) Notice: Subject to any disclaimer, the term of this patent is extended or adjusted under 35 U.S.C. 154(b) by 1308 days.

(21) Appl. No.: 12/056,281

(22) Filed: Mar. 27, 2008

(65) Prior Publication Data

US 2009/0161660 A1 Jun. 25, 2009

(30) Foreign Application Priority Data

Dec. 21, 2007 (TW) ................................ 96149317 A (51) Int. Cl.
*H04L 12/56* (2006.01)
(52) U.S. Cl. .......................... 370/352; 370/412; 370/389
(58) Field of Classification Search .................. 370/242, 370/395.42, 412, 428, 230.1, 389, 395.4, 370/352, 252, 468, 519; 725/142; 710/48
See application file for complete search history.

(56) References Cited

U.S. PATENT DOCUMENTS

| | | | |
|---|---|---|---|
| 5,191,583 A * | 3/1993 | Pearson et al. ................ 370/242 |
| 6,122,264 A | 9/2000 | Kaufman et al. | |
| 6,560,230 B1 * | 5/2003 | Li et al. .................... 370/395.42 |
| 6,657,987 B1 | 12/2003 | Kumar et al. | |
| 6,707,791 B1 * | 3/2004 | Sundqvist ................. 370/230.1 |
| 7,093,277 B2 * | 8/2006 | Perlman ........................ 725/142 |
| 7,372,820 B1 * | 5/2008 | Cheung et al. ............... 370/252 |
| 7,406,098 B2 * | 7/2008 | Taneja et al. ................. 370/468 |
| 2002/0105976 A1 * | 8/2002 | Kelly et al. .................... 370/519 |

(Continued)

FOREIGN PATENT DOCUMENTS

EP 1 475 985 A2 * 11/2004

(Continued)

OTHER PUBLICATIONS

Liao et al ,"Radio Resource Management for Adaptive Antenna System (ASS) in Project 802.16m SDD", Nov. 7, 2007, IEEE C802.16m-07/201; weblink: http://www.ieee802.org/16/tgm/contrib/C80216m-07_201.pdf.*

(Continued)

*Primary Examiner* — Asad Nawaz
*Assistant Examiner* — Parth Patel
(74) *Attorney, Agent, or Firm* — Jianq Chyun IP Office (57) ABSTRACT

A system for scheduling packets to be transmitted is provided. The system includes a soft delay bound calculator module and a frame determination module. The soft delay bound calculator module calculates a soft delay bound for a non-real-time packet based on a packet size of the non-real-time packet and a minimum reserved traffic rate of a channel. The frame determination module determines whether a real-time packet must be transmitted at a current frame according to a delay bound, a transmission time, and a possible retransmission time thereof, and whether a non-real-time packet must be transmitted at a current frame according to a soft delay bound, a transmission time, and a possible retransmission time thereof. Thus, it is possible to improve the performance of the system while keeping the QoS thereof in a mixed service environment.

12 Claims, 8 Drawing Sheets

U.S. PATENT DOCUMENTS

| | | | |
|---|---|---|---|
| 2003/0189943 A1* | 10/2003 | Gorti et al. | 370/412 |
| 2003/0235202 A1* | 12/2003 | Van Der Zee et al. | 370/428 |
| 2005/0058149 A1* | 3/2005 | Howe | 370/428 |
| 2005/0078674 A1* | 4/2005 | Koide et al. | 370/389 |
| 2005/0249226 A1* | 11/2005 | Kang | 370/412 |
| 2005/0281189 A1 | 12/2005 | Lee et al. | |
| 2006/0083233 A1* | 4/2006 | Nishibayashi et al. | 370/389 |
| 2006/0236002 A1* | 10/2006 | Valenci | 710/48 |
| 2007/0070894 A1 | 3/2007 | Wang et al. | |
| 2007/0280260 A1* | 12/2007 | Ryu et al. | 370/395.4 |
| 2007/0297415 A1* | 12/2007 | Lee et al. | 370/395.4 |
| 2008/0310409 A1* | 12/2008 | Larsson et al. | 370/389 |
| 2009/0135770 A1* | 5/2009 | Chen et al. | 370/329 |
| 2009/0196194 A1* | 8/2009 | Paloheimo et al. | 370/252 |
| 2009/0196282 A1* | 8/2009 | Fellman et al. | 370/352 |

FOREIGN PATENT DOCUMENTS

| | | | |
|---|---|---|---|
| EP | 1475985 A2 | * | 11/2004 |
| JP | 2000324535 A | * | 11/2000 |
| JP | 2003043174 A | * | 2/2003 |
| KR | 2002029816 A | * | 4/2002 |
| KR | 2002071138 A | * | 9/2002 |
| KR | 2006061016 A | * | 6/2006 |

OTHER PUBLICATIONS

Article titled "Opportunistic based Scheduling Control in Mobile WiMAX Systems" authored by Chiang, et al., The 22nd International Technical Conference on Circuits/Systems, Computers and Communications, Jul. 8-11, 2007.

* cited by examiner

SYSTEM, METHOD, AND RECORDING MEDIUM FOR SCHEDULING PACKETS TO BE TRANSMITTED

CROSS-REFERENCE TO RELATED APPLICATION

This application claims the priority benefit of Taiwan application serial no. 96149317, filed on Dec. 21, 2007. The entirety of the above-mentioned patent application is hereby incorporated by reference herein and made a part of this specification.

BACKGROUND OF THE INVENTION

1. Field of the Invention

The present invention generally relates to a scheduling method, in particular, to a system, method, and recording medium for scheduling packets to be transmitted.

2. Description of Related Art

The wide application of Internet and wireless communication has increasing demands for multi-media services via Internet and mobile/wireless channel streaming media. In an Internet protocol (IP) network, multi-media is provided by a server and streamed to one or more wired or wireless clients. Wired connection includes dial-up, integrated services digital network (ISDN), cable, digital subscriber line protocol (referred to collectively as "xDSL"), optical fiber, local area network (LAN), wide area network (WAN), and so on. Electronic equipments employing wireless communication include phones (for example, cell-phones), personal data assistants (PDAs), and hand-held, portable computers, and so on.

Worldwide Interoperability for Microwave Access (WiMAX) is a new wireless broadband network system based on IEEE 802.16 standards. The communication between a WiMAX base station and a subscriber station is achieved by sending/receiving a series of frames.

WiMAX 802.16e system is mobile, and may be used in a variety of transmission environments. Besides, the WiMAX 802.16e system has many different types of support services, and the support services have different requirements on quality of service (QoS). Therefore, a conventional method for scheduling packets to be transmitted may neither meet the requirements on QoS nor achieve the optimal transmission performance. Further, for real-time services such as VoIP and streaming services, the delay bounds thereof are defined in the system specification. However, for non-real-time services, only the minimum reserved traffic rates thereof are defined in the specification. As a result, the conventional method for scheduling packets to be transmitted is impossible to effectively support non-real-time services. Therefore, it is required to develop a method for transmitting packets to improve the performance and capacity of the system while keeping the QoS thereof in a mixed service (real-time service and non-real-time service) environment.

SUMMARY OF THE INVENTION

Accordingly, the present invention is directed to a system for scheduling packets to be transmitted, so as to improve the performance and capacity of the system while keeping the QoS thereof in a mixed service environment.

The present invention is directed to a method for scheduling packets to be transmitted, so as to improve the performance and capacity of the system while keeping the QoS thereof in a mixed service environment.

The present invention is directed to a computer-readable recording medium having a computer program for performing a method for scheduling packets to be transmitted, so as to improve the performance and capacity of the system while keeping the QoS thereof in a mixed service environment.

The present invention provides a system for scheduling packets to be transmitted, in which the packets to be transmitted include real-time packets and non-real-time packets. The system includes a soft delay bound calculator module and a frame determination module. The soft delay bound calculator module calculates a soft delay bound for each of the non-real-time packets based on a packet size of the non-real-time packet and a minimum reserved traffic rate of a channel. The frame determination module determines whether a real-time packet must be transmitted at a current frame according to a delay bound, a transmission time, and a possible retransmission time thereof, and whether a non-real-time packet must be transmitted at a current frame according to a soft delay bound, a transmission time, and a possible retransmission time thereof.

In an embodiment of the present invention, the soft delay bound of each of the non-real-time packets is calculated by dividing the packet size of the non-real-time packet by the minimum reserved traffic rate.

In an embodiment of the present invention, the system for scheduling packets to be transmitted further includes an available resource determination module, a packet grouping module, and a packet selection module. The available resource determination module determines whether the current frame has any available resource for transmitting other packets. The packet grouping module sequentially groups the other packets into a plurality of groups according to the delay bound or soft delay bound of each packet. The packet selection module selects at least one packet from each of the groups according to a transmission efficiency thereof, so as to schedule the selected packets at the current frame.

In an embodiment of the present invention, the transmission efficiency of each packet is calculated using a difference of a result of dividing the packet size by an estimated data amount per resource unit minus a result of dividing the packet size by a least data amount per resource unit.

In an embodiment of the present invention, a different number of the packets is selected from each group.

The present invention provides a method for scheduling packets to be transmitted, which includes the following steps. A plurality of packets to be transmitted is first provided, in which the packets to be transmitted include a plurality of real-time packets and a plurality of non-real-time packets. Next, it is determined whether a real-time packet must be transmitted at a current frame according to a delay bound, a transmission time, and a possible retransmission time thereof. Afterwards, a soft delay bound of each of the non-real-time packets is calculated based on a packet size of the non-real-time packet and a minimum reserved traffic rate of a channel. Then, it is determined whether a non-real-time packet must be transmitted at the current frame according to a soft delay bound, a transmission time, and a possible retransmission time thereof.

In an embodiment of the present invention, the soft delay bound of each of the non-real-time packets is calculated by dividing a packet size of the non-real-time packet by the minimum reserved traffic rate.

In an embodiment of the present invention, the method for scheduling packets to be transmitted further includes determining whether the current frame has any available resource for transmitting other packets. If the current frame still has an available resource, the other packets are sequentially grouped into a plurality of groups according to the delay bound or soft delay bound of each packet, and at least one packet is selected from each of the groups according to the transmission efficiency thereof, so as to schedule the selected packets at the current frame.

In an embodiment of the present invention, the transmission efficiency of each packet is calculated by a difference of a result of dividing the packet size by an estimated data amount per resource unit minus a result of dividing the packet size by a least data amount per resource unit.

In an embodiment of the present invention, a different number of the packets is selected from each group.

The present invention provides a computer-readable recording medium having a computer program for performing a method for scheduling packets to be transmitted, in which the method for scheduling packets to be transmitted includes the following steps. A plurality of packets to be transmitted is first provided, in which the packets to be transmitted include a plurality of real-time packets and a plurality of non-real-time packets. Next, it is determined whether a real-time packet must be transmitted at a current frame according to a delay bound, a transmission time, and a possible retransmission time thereof. Afterwards, a soft delay bound of each of the non-real-time packets is calculated based on a packet size of the non-real-time packet and a minimum reserved traffic rate of a channel. Then, it is determined whether a non-real-time packet must be transmitted at the current frame according to a soft delay bound, a transmission time, and a possible retransmission time thereof.

In an embodiment of the present invention, the soft delay bound of each of the non-real-time packets is calculated by dividing the packet size of the non-real-time packet by the minimum reserved traffic rate.

In an embodiment of the present invention, the method for scheduling packets to be transmitted further includes determining whether the current frame has any available resource for transmitting other packets. If the current frame still has an available resource, the other packets are sequentially grouped into a plurality of groups according to the delay bound or soft delay bound of each packet, and at least one packet is selected from each of the groups according to a transmission efficiency thereof, so as to schedule the selected packets at the current frame.

In an embodiment of the present invention, the transmission efficiency of each packet is calculated using a difference of a result of dividing the packet size by an estimated data amount per resource unit minus a result of dividing the packet size by a least data amount per resource unit.

In an embodiment of the present invention, a different number of the packets is selected from each group.

The present invention provides a system for scheduling packets to be transmitted, in which the packets to be transmitted include real-time packets and non-real-time packets. The system includes a soft delay bound calculator module, a packet grouping module, and a packet selection module. The soft delay bound calculator module calculates a soft delay bound for each of the non-real-time packets based on a packet size of the non-real-time packet and a minimum reserved traffic rate of a channel. The packet grouping module sequentially groups the packets into a plurality of groups according to the delay bound of each of the real-time packets and the soft delay bound of each of the non-real-time packets. The packet selection module selects at least one packet from each of the groups according to a transmission efficiency thereof, so as to schedule the selected packets at the current frame.

In an embodiment of the present invention, the soft delay bound of each of the non-real-time packets is calculated by dividing the packet size of the non-real-time packet by the minimum reserved traffic rate.

In an embodiment of the present invention, the transmission efficiency of each packet is calculated using a difference of a result of dividing the packet size by an estimated data amount per resource unit minus a result of dividing the packet size by a least data amount per resource unit.

In an embodiment of the present invention, a different number of the packets is selected from each group.

The present invention provides a method for scheduling packets to be transmitted, which includes the following steps. A plurality of packets to be transmitted is first provided, in which the packets to be transmitted include a plurality of real-time packets and a plurality of non-real-time packets. Afterwards, a soft delay bound of each of the non-real-time packets is calculated based on a packet size of the non-real-time packet and a minimum reserved traffic rate of a channel. Then, the packets are sequentially grouped into a plurality of groups according to the delay bound of each of the real-time packets and the soft delay bound of each of the non-real-time packets, and at least one packet is selected from each of the groups according to a transmission efficiency thereof, so as to schedule the selected packets at the current frame.

In an embodiment of the present invention, the soft delay bound of each of the non-real-time packets is calculated by dividing the packet size of the non-real-time packet by the minimum reserved traffic rate.

In an embodiment of the present invention, the transmission efficiency of each packet is calculated using a difference of the result of dividing the packet size by an estimated data amount per resource unit minus a result of dividing the packet size by a least data amount per resource unit.

In an embodiment of the present invention, a different number of the packets is selected from each group.

The present invention provides a computer-readable recording medium having a computer program for performing a method for scheduling packets to be transmitted, in which the method for scheduling packets to be transmitted includes the following steps. A plurality of packets to be transmitted is first provided, in which the packets to be transmitted include a plurality of real-time packets and a plurality of non-real-time packets. Afterwards, a soft delay bound of each of the non-real-time packets is calculated based on a packet size of the non-real-time packet and a minimum reserved traffic rate of a channel. Then, the packets are sequentially grouped into a plurality of groups according to the delay bound of each of the real-time packets and the soft delay bound of each of the non-real-time packets, and at least one packet is selected from each of the groups according to a transmission efficiency thereof, so as to schedule the selected packets at the current frame.

In an embodiment of the present invention, the soft delay bound of each of the non-real-time packets is calculated by dividing the packet size of the non-real-time packet by the minimum reserved traffic rate.

In an embodiment of the present invention, the transmission efficiency of each packet is calculated using a difference of a result of dividing the packet size by an estimated data amount per resource unit minus a result of dividing the packet size by a least data amount per resource unit.

In an embodiment of the present invention, a different number of the packets is selected from each group.

Therefore, the present invention adopts a soft delay bound of each of the non-real-time packets and a delay bound of each of the real-time packets, and schedules the packets to be transmitted according to the delay bound and the soft delay bound of each packet, so as to improve the performance and capacity of the system while keeping the QoS thereof in a mixed service environment.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

The present invention takes the mobility of a mobile network system and various types of services into account, and puts forward a scheduling method which meets the requirements of different types of QoS, and improves the transmission performance of the system according to the diversified transmission efficiencies of the users in the system.

In the time division duplex (TDD) mode of wireless communication, a TDD frame duration is fixed, acceptable frame durations for orthogonal frequency division multiplex (OFDM) technique are 2.5 milliseconds (ms), 4 ms, 5 ms, 10 ms, 12.5 ms, and 20 ms, and acceptable frame durations for orthogonal frequency division multiplex access (OFDMA) technique are 2 ms, 2.5 ms, 4 ms, 5 ms, 8 ms, 10 ms, 12.5 ms, and 20 ms. The WiMAX specification adopts OFDM and OFDMA techniques, and the current frame duration of the mobile WiMAX is 5 ms. One TDD frame is constituted by a downlink (DL) subframe and an uplink (UL) subframe. In an example of the present invention, a WiMAX 802.16e system adopts an OFDMA physical layer and the TDD mode. Particularly, the DL is taken as an example for illustration in the below embodiments. However, it would be appreciated that the embodiments are used only for clarifying the present invention, instead of limiting the scope of the present invention.

The First Embodiment

Figure 1:
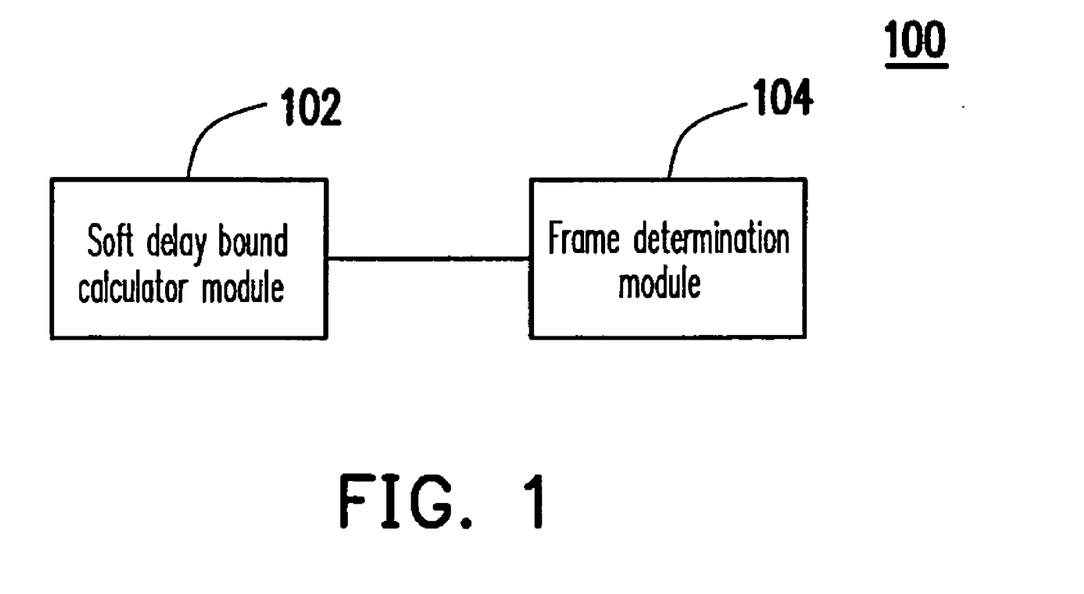
FIG. 1 is a block view of a system for scheduling packets to be transmitted according to a first embodiment of the present invention.

FIG. 1 is a block view of a system for scheduling packets to be transmitted according to a first embodiment of the present invention.

Referring to FIG. 1, the system 100 for scheduling packets to be transmitted is used to schedule packets to be transmitted in a WiMAX 802.16e system. In detail, the system 100 for scheduling packets to be transmitted schedules and controls the packets to be transmitted by taking the type of traffic passing through a network layer, radio frequency feedback conditions from the physical layer, and information from a media access control layer into account. It should be noted that the 802.16e system includes a packet classifier (not shown), for classifying the plurality of packets to be transmitted into real-time packets and non-real-time packets. The system 100 for scheduling packets to be transmitted includes a soft delay bound calculator module 102 and a frame determination module 104. However, it should be appreciated that the system 100 for scheduling packets to be transmitted may further include other control modules.

The soft delay bound calculator module 102 calculates a soft delay bound for each of the non-real-time packets based on the packet size of the non-real-time packet and a minimum reserved traffic rate of a channel in the WiMAX 802.16e system.

For the real-time services (real-time packets) such as VoIP and streaming services, the delay bounds thereof are defined in the specification of the WiMAX 802.16e system, specifying that each of the real-time packets cannot be regarded as reaching the QoS defined by the system unless the transmission of the real-time packets is completed before the delay bound thereof. However, for the non-real-time services (non-real-time packets), only the minimum reserved traffic rate thereof is defined in the specification and the delay bound is not defined. Thus, for example, in this embodiment, the delay bound of each of the non-real-time packets is a soft delay bound calculated by dividing the packet size of the non-real-time packet (i.e., the data amount of the packet) by the minimum reserved traffic rate (as shown in Formula (1)). Accordingly, in this embodiment, the system 100 for scheduling packets to be transmitted considers the QoS based on the delay bound of each of the real-time packets and the soft delay bound of each of the non-real-time packets.

$$\text{soft delay bound} = \frac{\text{packet size}}{\text{minimum reserved traffic rate}} \quad (1)$$

The frame determination module 104 is used to determine the urgency of the packets. In detail, the frame determination module 104 determines whether a real-time packet must be transmitted at a current frame according to a delay bound, a transmission time, and a possible retransmission time thereof, and whether a non-real-time packet must be transmitted at a current frame according to a soft delay bound, a transmission time, and a possible retransmission time thereof. When it is determined that a packet must be transmitted at a current frame, the frame determination module 104 schedules the packet at the current frame.

In more detail, the frame determination module 104 considers the QoS of the system through the delay bounds and soft delay bounds. Therefore, in order to meet the requirements of the QoS of the system, the frame determination module 104 finds out the packets that may exceed the delay bounds thereof if not transmitted at a current frame in a manner of earliest deadline first (EDF), and then transmits these packets in priority.

However, besides the delay bounds (i.e., the delay bound of each of the real-time packets and the soft delay bound of each of the non-real-time packets), the frame determination module 104 also considers the transmission time and retransmission time based on the characteristics of the 802.16e system (i.e., the characteristics of the OFDMA physical layer and the TDD mode). The retransmission time is the time reserved for an automatic repeat-request (ARQ) for retransmission if a possible transmission error occurs. In other words, the frame determination module 104 determines whether a packet can be transmitted at a non-current frame (i.e., whether the packet can be transmitted at a later frame while keeping the QoS thereof) by deducting the above time and frame length from the delay bound of the packet. If it is determined that the packet must be transmitted at a current frame in order to keep the QoS thereof, the frame determination module 104 schedules the packet in priority.

Figure 2:
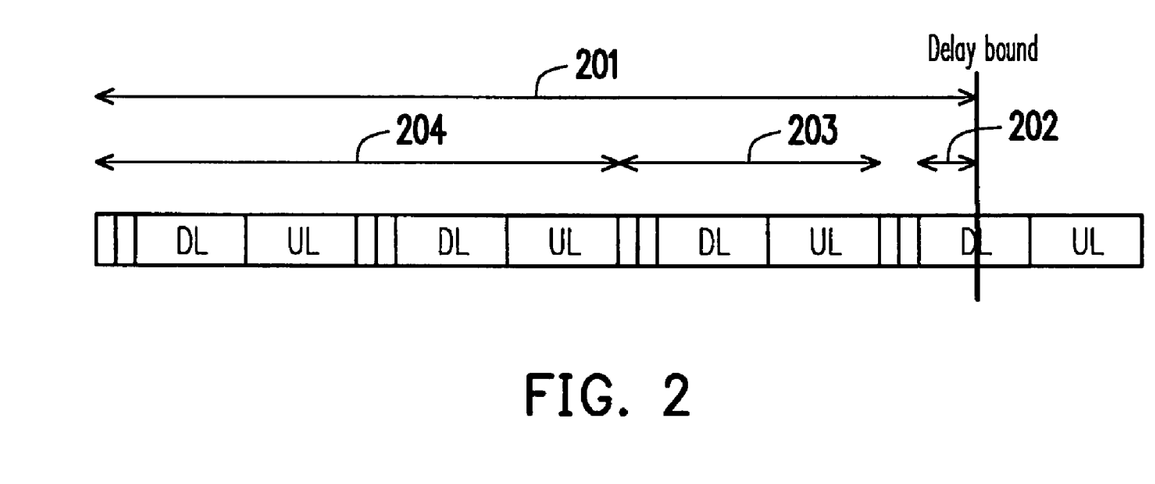
FIG. 2 shows an example of determining whether a packet is urgent according to an embodiment of the present invention.

FIG. 2 shows an example of determining whether a packet is urgent according to an embodiment of the present invention. Referring to FIG. 2, taking the time before a transmission time 202 and a retransmission time 203 in a delay bound time 201 of a packet into account, it can be determined that the packet may be transmitted at a current and the next frame (i.e., an available frame 204) while still keeping the QoS thereof, so this packet is not urgent.

Figure 3:
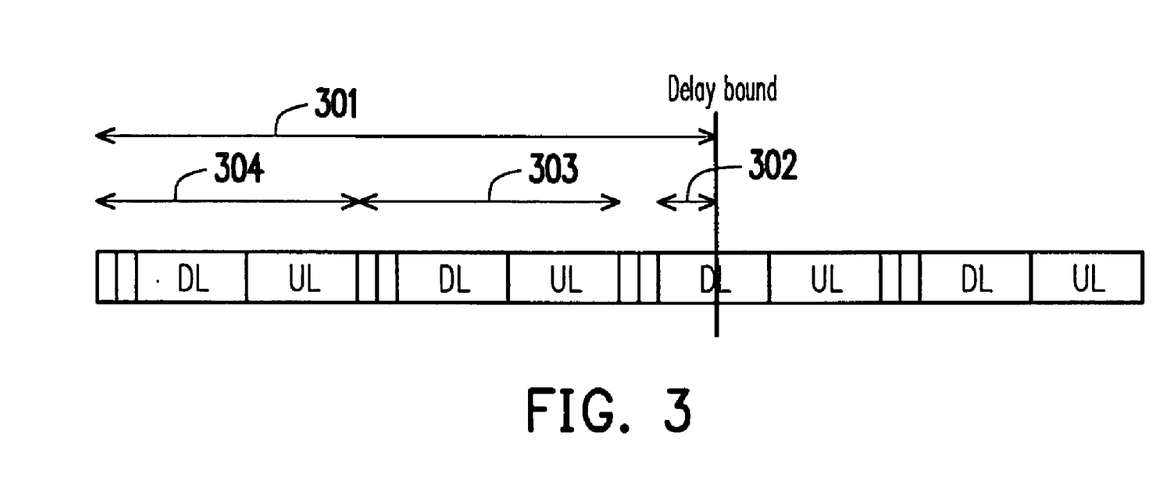
FIG. 3 shows another example of determining whether a packet is urgent according to an embodiment of the present invention.

FIG. 3 shows another example of determining whether a packet is urgent according to an embodiment of the present invention. Referring to FIG. 3, taking the time prior to a transmission time 302 and a retransmission time 303 in a delay bound time 301 of a packet into account, it can be determined that the packet must be transmitted at a current frame (i.e., an available frame 304) in order to keep the QoS thereof, so this packet is urgent.

In view of the above, the frame determination module 104 schedule packets according to the time prior to the delay bound (i.e., the user packet first reaching the delay bound will be transmitted in priority), so as to meet the requirement of the QoS.

Figure 4:
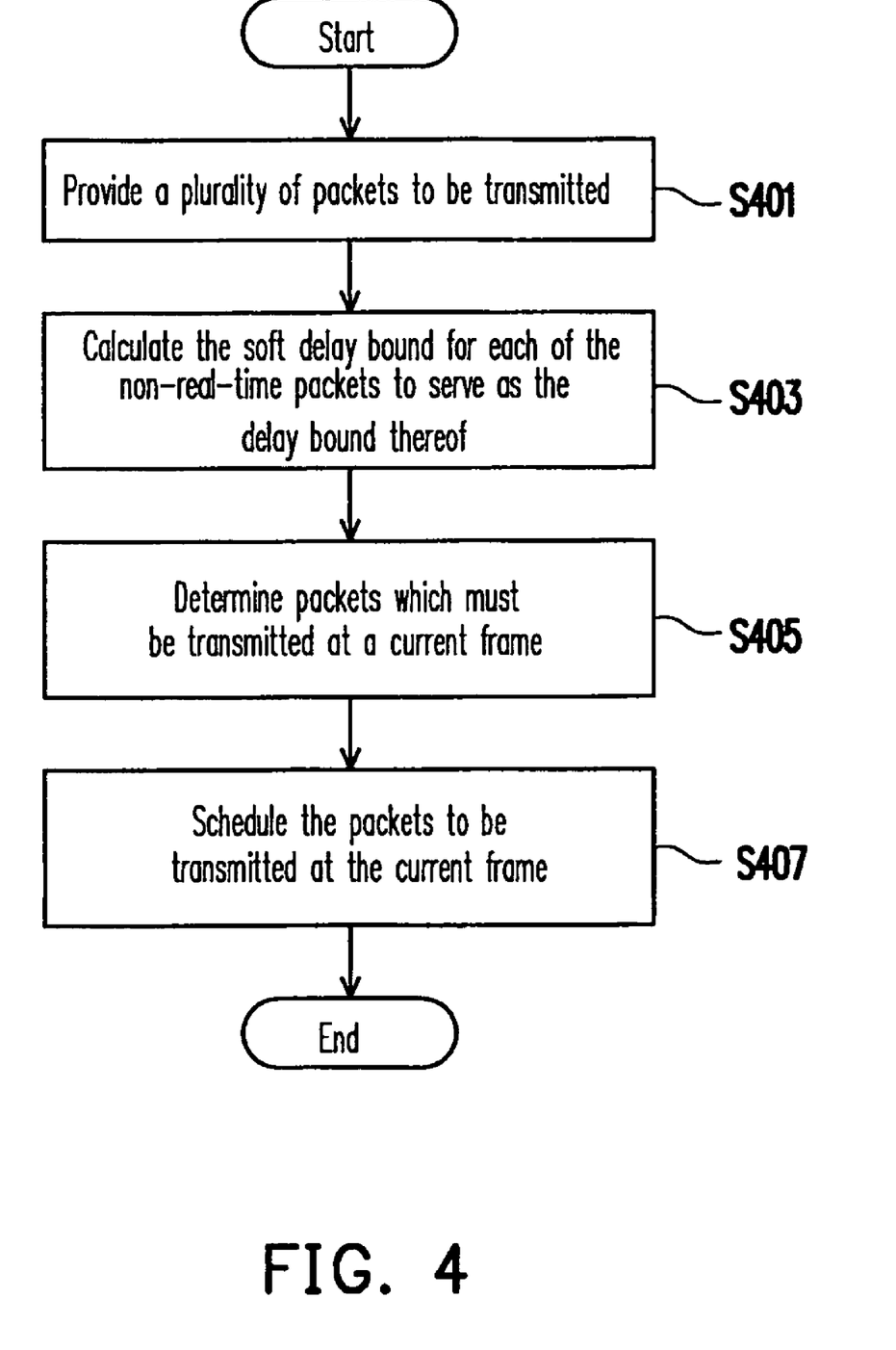
FIG. 4 is a flow chart of a method for scheduling packets to be transmitted according to the first embodiment of the present invention.

FIG. 4 is a flow chart of a method for scheduling packets to be transmitted according to the first embodiment of the present invention.

Referring to FIG. 4, a plurality of packets to be transmitted is first provided (Step S401), in which the packets to be transmitted include a plurality of real-time packets and a plurality of non-real-time packets. Next, the soft delay bound of each of the non-real-time packets is calculated to serve as the delay bound thereof in Step S403.

Afterwards, it is determined whether a packet must be transmitted at a current frame according to a delay bound (i.e., the delay bound of each of the real-time packets and the soft delay bound of each of the non-real-time packets), a transmission time, and a possible retransmission time thereof in Step S405. Then, in Step S407, the packets to be transmitted are scheduled at the current frame.

In view of the above, according to this embodiment, urgent real-time packets and non-real-time packets are transmitted in priority based on the delay bound and soft delay bound of each packet, such that the system and method for scheduling packets to be transmitted may consider the QoS of the real-time packets and non-real-time packets at the same time.

The Second Embodiment

In the first embodiment, the concept of the soft delay bound defined by the present invention is adopted to make the system for scheduling packets to be transmitted consider the QoS of the real-time packets and non-real-time packets at the same time. However, in this embodiment, the packets are grouped based on the soft delay bound of each of the non-real-time packets and the delay bound of each of the real-time packets. Then, the packets to be transmitted at a current frame are selected according to the channel conditions of the packets, so as to avoid the problem that the resources are insufficient for transmitting the packets due to channel unbalance. This embodiment will be illustrated in detail below in accompanied with FIGS. 5 to 7.

Figure 5:
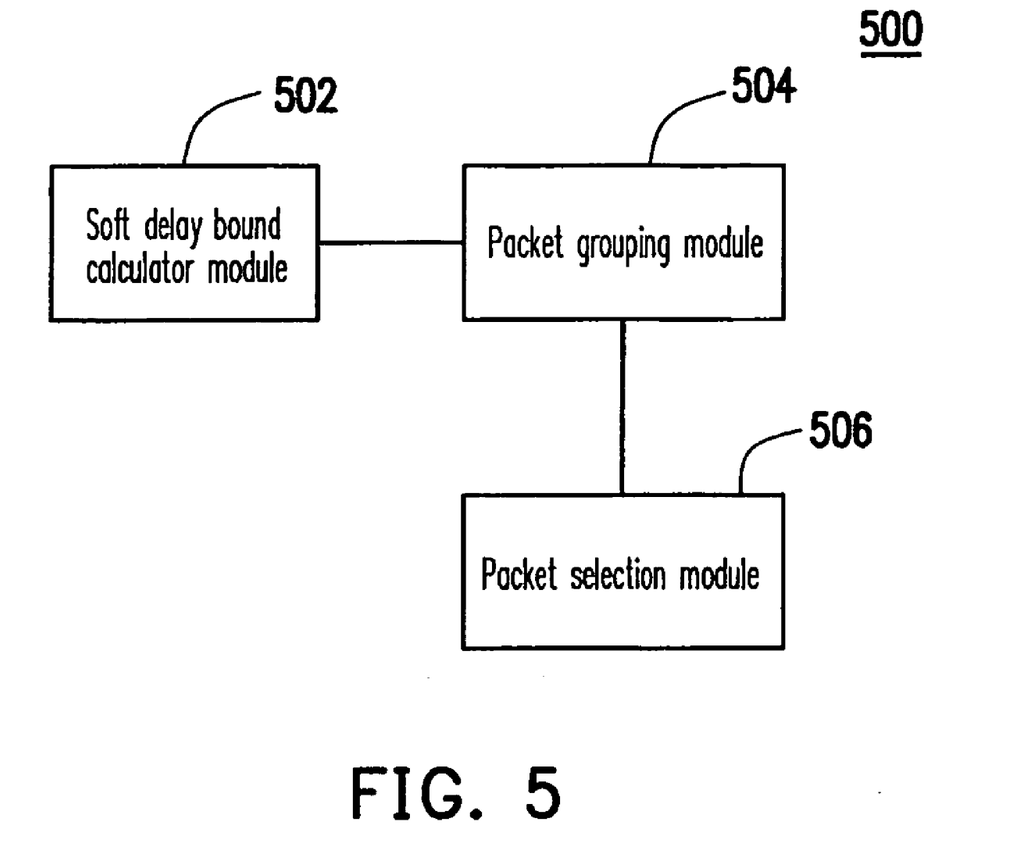
FIG. 5 is a block view of a system for scheduling packets to be transmitted according to a second embodiment of the present invention.

FIG. 5 is a block view of a system for scheduling packets to be transmitted according to a second embodiment of the present invention.

Referring to FIG. 5, the system 500 for scheduling packets to be transmitted is used to schedule the packets to be transmitted in a WiMAX 802.16e system. In detail, the system 500 for scheduling packets to be transmitted schedules and controls the packets to be transmitted by taking the type of traffic passing through a network layer, radio frequency feedback conditions from the physical layer, and information from a media access control layer into account. It should be noted that, the 802.16e system includes a packet classifier (not shown), for classifying the plurality of packets to be transmitted into real-time packets and non-real-time packets. The system 500 for scheduling packets to be transmitted includes a soft delay bound calculator module 502, a packet grouping module 504, and a packet selection module 506.

The structure and function of the soft delay bound calculator module 502 is identical to those of the soft delay bound calculator module 102 in the first embodiment, so the details will not be described herein again.

The packet grouping module 504 sequentially groups the packets into a plurality of groups according to the delay bound of each of the real-time packets and the soft delay bound of each of the non-real-time packets.

Figure 6:
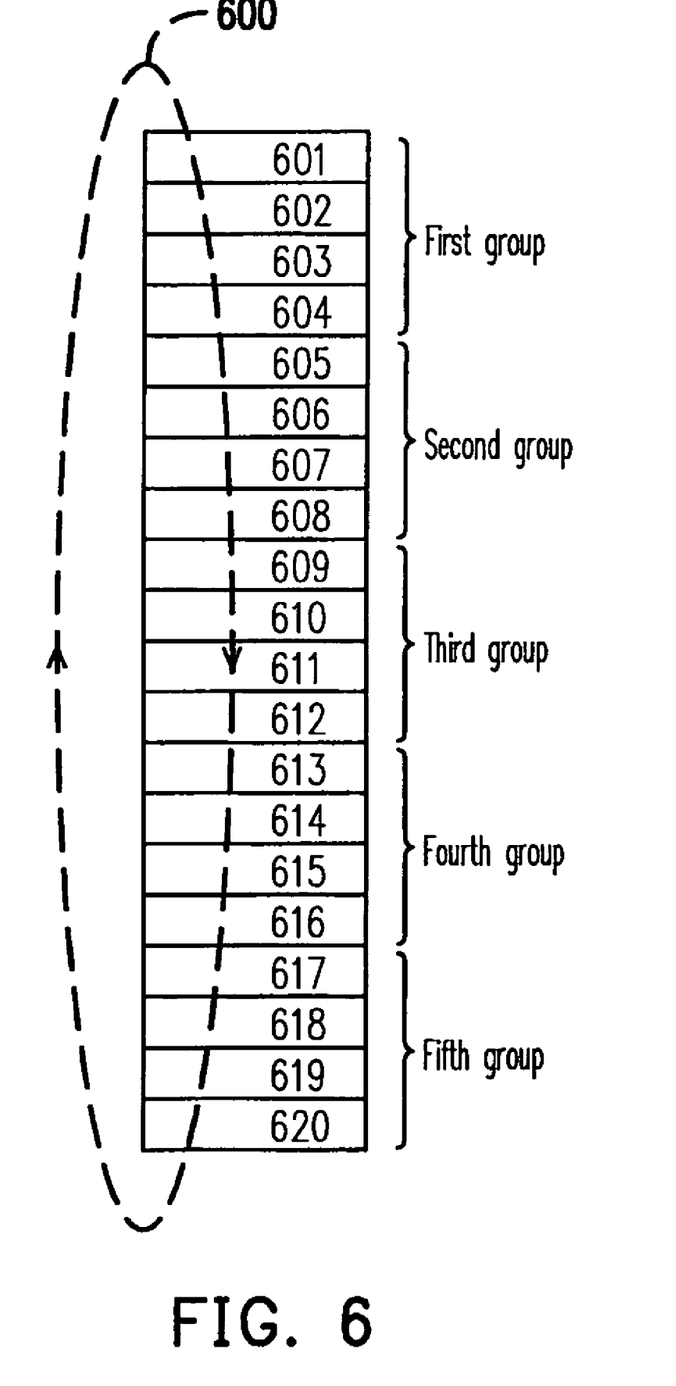
FIG. 6 shows an example of grouping the packets according to the second embodiment of the present invention.

FIG. 6 shows an example of grouping the packets according to the second embodiment of the present invention. Referring to FIG. 6, the system has 20 packets 601 to 620 to be transmitted, and these packets are sequentially arranged as packets 601 to 620 according to the delay bound of each packet (i.e., the delay bound of each of the real-time packets and the soft delay bound of each of the non-real-time packets) from nearest to farthest to the current frame. The packet grouping module 504 groups the 20 packets into 5 groups based on the above sequence. The first group includes packets 601 to 604, the second group includes packets 605 to 608, the third group includes packets 609 to 612, the fourth group includes packets 613 to 616, and the fifth group includes packets 617 to 620.

Referring to FIG. 5 again, the packet selection module 506 selects the packets from each of the groups according to the transmission efficiency of each packet, so as to schedule the selected packets at the current frame. In detail, the packet selection module 506 sequentially selects a packet from each of the groups according to the transmission efficiency thereof within the capacity of the current frame, and repeats the selection of the packets (600 in FIG. 6) till the capacity of the current frame runs out. In this embodiment, the transmission efficiency of each packet is calculated using a difference of a result of dividing the packet size by an estimated data amount per resource unit minus a result of dividing the packet size by a least data amount per resource unit (as shown in Formula (2)).

$$\text{transmission efficiency} = \frac{\text{packet size}}{\text{estimated data amount per resource unit}} - \frac{\text{packet size}}{\text{least data amount per resource unit}} \quad (2)$$

The estimated data amount per resource unit refers to the data transmission amount of a currently adopted modulation mode (such as 16-quadrature amplitude modulation (QAM), or 64-QAM) in a user channel of the packet to be transmitted. The least data amount per resource unit refers to the smallest data transmission amount defined in the system. For example, the modulation mode of the least data amount per resource unit is quadrature phase-shift keying (QPSK) modulation in the WiMAX 802.16e system. If the above difference is greater, the user may be transmitted more efficiently. Thus, the packet selection module 506 may select a packet with a greater difference from each of the groups for scheduling.

For example, referring to FIG. 6, it is assumed that the packet 602 in the first group, the packet 607 in the second group, the packet 609 in the third group, the packet 616 in the fourth group, and the packet 618 in the fifth group are respectively the packet with the greatest difference in each group, so the packet selection module 506 sequentially selects the packets 602, 607, 609, 616, and 618 in the first run of selection, so as to schedule the selected packets at a current frame.

Figure 7:
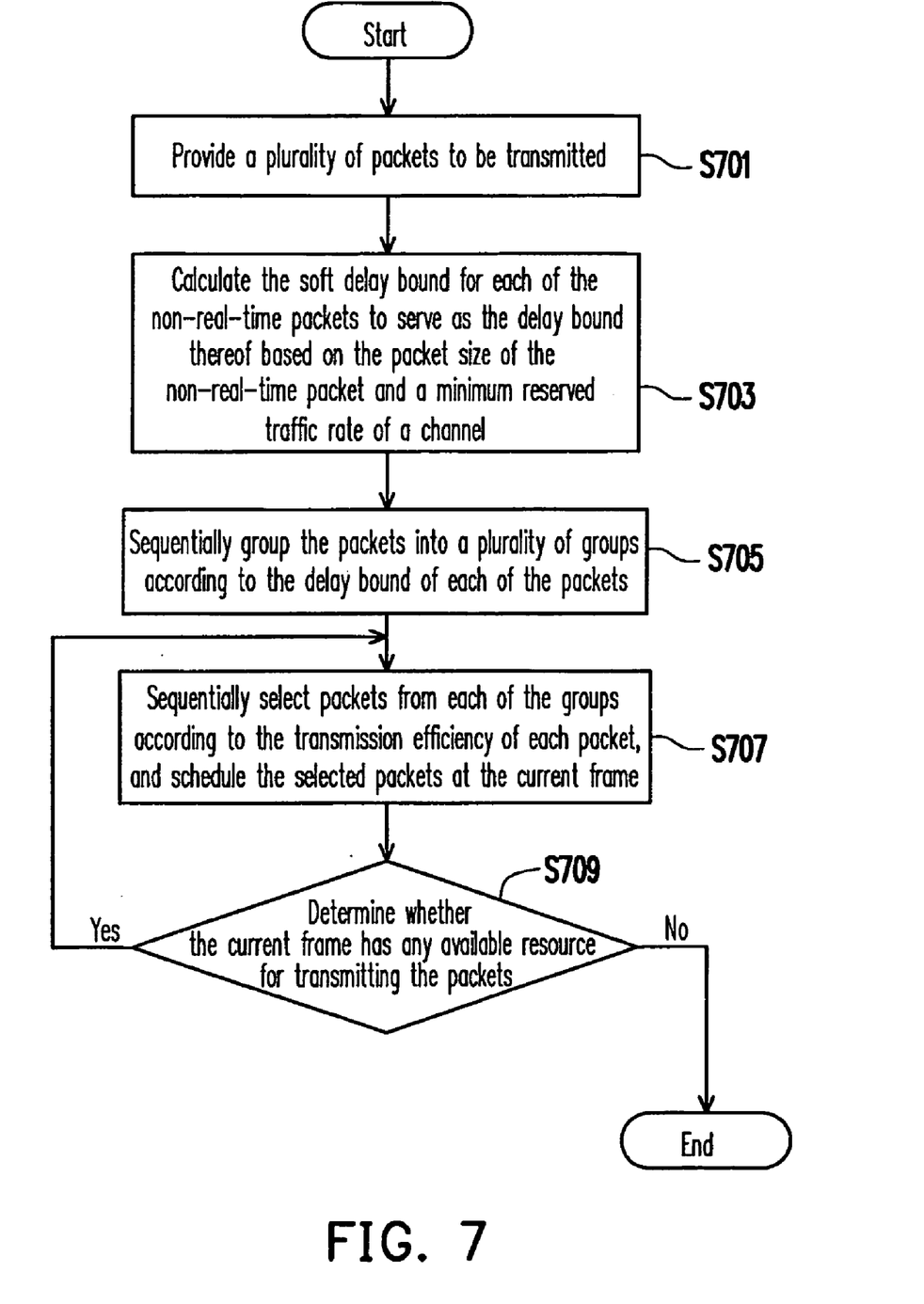
FIG. 7 is a flow chart of a method for scheduling packets to be transmitted according to the second embodiment of the present invention.

FIG. 7 is a flow chart of a method for scheduling packets to be transmitted according to the second embodiment of the present invention.

Referring to FIG. 7, a plurality of packets to be transmitted is first provided (Step S701), which includes a plurality of real-time packets and a plurality of non-real-time packets. Next, in Step S703, the soft delay bound of each of the non-real-time packets is calculated to serve as the delay bound thereof based on the packet size of the non-real-time packet and a minimum reserved traffic rate of a channel. Afterwards, in Step S705, the packets are sequentially grouped into a plurality of groups according to the delay bound of each of the packets. Then, in Step S707, the packets are sequentially selected from each of the groups according to the transmission efficiency of each packet, and the selected packets are scheduled at the current frame. Thereafter, in Step S709, it is determined whether the current frame has any available resource for transmitting the packets. If it is determined in Step S709 that the current frame still has an available resource for transmitting the packets, return to Step S707 (i.e., the selection of the packets is repeated in turn till the capacity of the current frame runs out).

It should be noted that, in this embodiment, one packet is selected at a time from each of the groups according to the transmission efficiency thereof. However, in another embodiment of the present invention, different numbers of packets are selected from each of the groups. For example, a large number of packets may be selected at a time from a group with a delay bound near the current frame, and a small number of packets may be selected at a time from a group with a delay bound far from the current frame.

In this embodiment, the packets are grouped into different groups based on the time interval to the delay bound of each packet, and then the channel condition of each packet is considered. If the channel condition is better, the transmission method is more efficient for transmitting a larger amount of data. On the contrary, if the channel condition is worse, the transmission method is less desirable, and a smaller amount of data is transmitted. As such, the problem of channel unbalance is avoided, thereby improving the data transmission amount and the capacity of the system.

The Third Embodiment

In the first embodiment, the concept of the soft delay bound defined by the present invention is adopted to make the system for scheduling packets to be transmitted consider the QoS of the real-time packets and non-real-time packets at the same time. In the second embodiment, the packets are grouped based on the soft delay bound of each of the non-real-time packets and the delay bound of each of the real-time packets, and then the packets to be transmitted at a current frame are selected according to the channel conditions of the packets, so as to avoid the problem that the resources are insufficient for transmitting the packets caused by the channel unbalance. However, the methods in the first and second embodiments may be combined for scheduling packets.

Figure 8:
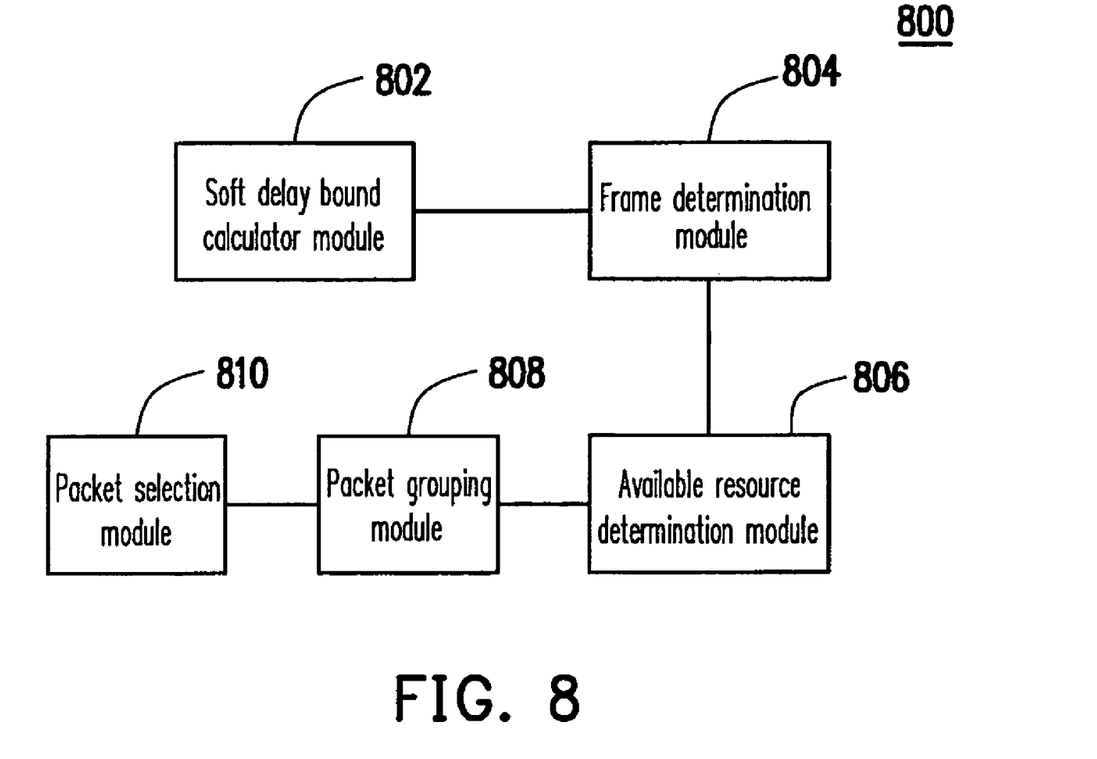
FIG. 8 is a block view of a system for scheduling packets to be transmitted according to a third embodiment of the present invention.

FIG. 8 is a block view of a system for scheduling packets to be transmitted according to a third embodiment of the present invention.

Referring to FIG. 8, the system 800 for scheduling packets to be transmitted is used to schedule the packets to be transmitted in a WiMAX 802.16e system. In detail, the system 800 for scheduling packets to be transmitted schedules and controls the packets to be transmitted by taking the type of traffic passing through a network layer, radio frequency feedback conditions from the physical layer, and information from a media access control layer into account. It should be noted that the 802.16e system includes a packet classifier (not shown), for classifying the plurality of packets to be transmitted into real-time packets and non-real-time packets. The system 800 for scheduling packets to be transmitted includes a soft delay bound calculator module 802, a frame determination module 804, an available resource determination module 806, a packet grouping module 808, and a packet selection module 810.

The soft delay bound calculator module 802 and the frame determination module 804 are identical to the soft delay bound calculator module 102 and the frame determination module 104 in the first embodiment. The packet grouping module 808 and the packet selection module 810 are identical to the packet grouping module 504 and the packet selection module 506 in the second embodiment, so the details will not be described herein again.

The available resource determination module 806 determines whether the current frame has any available resource for transmitting packets. In detail, in this embodiment, the scheduling is divided into two stages. In the first stage, the frame determination module 804 schedules urgent packets in priority at a current frame. Next, in the second stage, the available resource determination module 806 determines whether the current frame has any available resource for transmitting other packets. If it is determined that the current frame still has an available resource for transmitting other packets, the packet selection module 810 selects the packets to be scheduled at the current frame from packet groups formed by the packet grouping module 808 according to the transmission efficiency of each packet.

Figure 9:
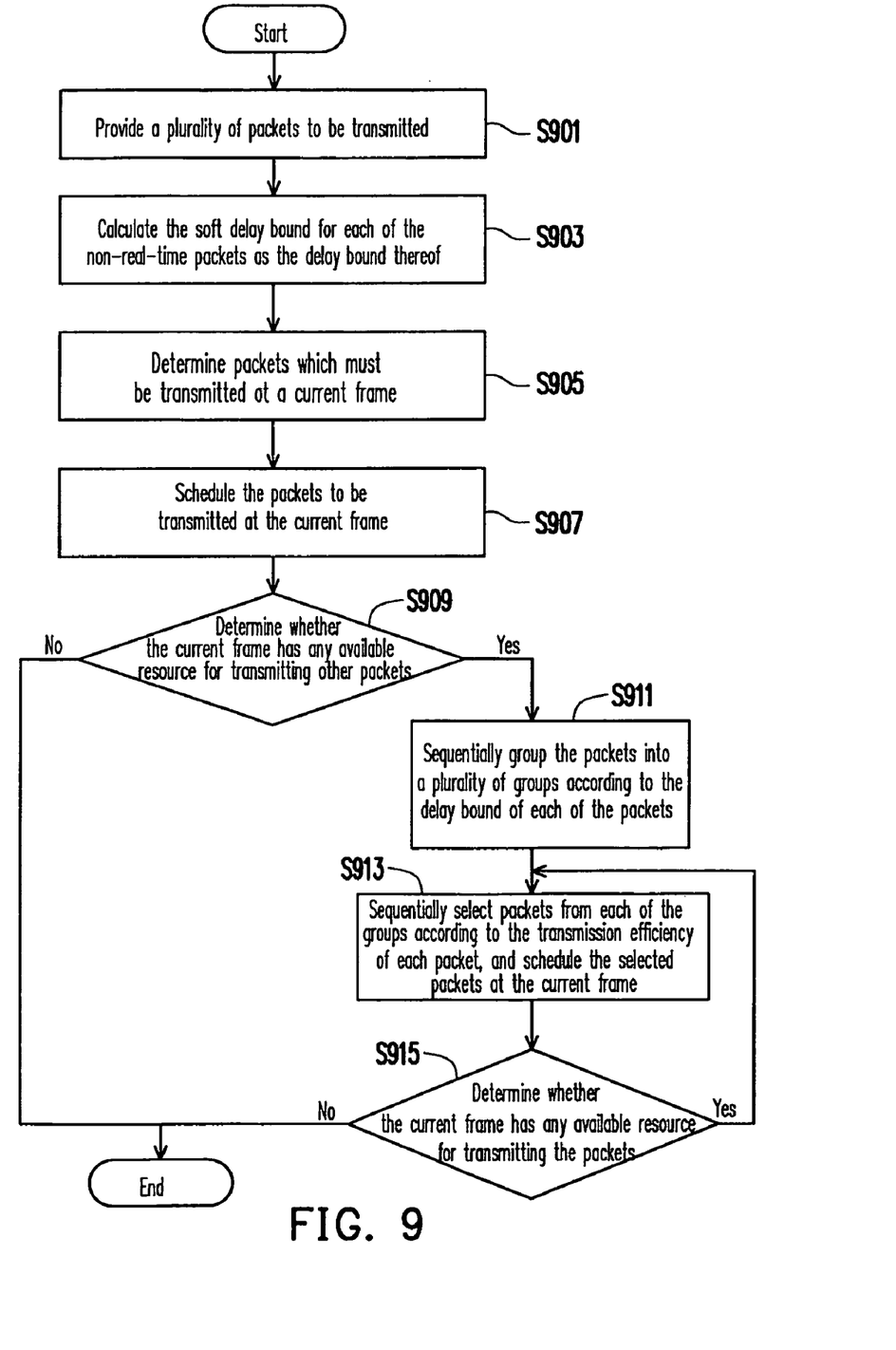
FIG. 9 is a flow chart of a method for scheduling packets to be transmitted according to the third embodiment of the present invention.

FIG. 9 is a flow chart of a method for scheduling packets to be transmitted according to the third embodiment of the present invention.

Referring to FIG. 9, in this embodiment, the method for scheduling packets to be transmitted is divided into two stages. In the first stage, a plurality of packets to be transmitted including a plurality of real-time packets and a plurality of non-real-time packets is first provided (Step S901). Next, the soft delay bound of each of the non-real-time packets is calculated to serve as the delay bound thereof in Step S903.

Afterwards, it is determined whether a packet must be transmitted at a current frame according to a delay bound (i.e., the delay bound of a real-time packet and the soft delay bound of a non-real-time packet), a transmission time, and a possible retransmission time thereof in Step S905. Then, in Step S907, the packets to be transmitted are scheduled at the current frame.

After the first stage is completed, in the second stage, it is determined whether the current frame has any available resource for transmitting other packets (Step S909). If it is determined from Step S909 that the current frame still has an available resource for transmitting other packets, the packets are sequentially grouped into a plurality of groups according to the delay bound of each packet (i.e., the delay bound of each of the real-time packets and the soft delay bound of each of the non-real-time packets) in Step S911. Next, in Step S913, the packets are sequentially selected from each of the groups according to the transmission efficiency of each packet, and the selected packets are scheduled at the current frame. Thereafter, in Step S915, it is again determined whether the current frame has any available resource for transmitting the packets. If it is determined from Step S915 that the current frame still has an available resource for transmitting the packets, return to Step S913 (i.e., the selection of the packets is repeated in turn till the capacity of the current frame runs out).

In this embodiment, the urgent packets are scheduled in the first stage, then the rest of the packets are grouped according to the delay bound of each packet. Afterwards, the second stage is carried out by taking the channel condition of each packet user into account, so as to improve the performance of the system while keeping the QoS thereof.

It should be noted that, the method for scheduling packets to be transmitted in the first, second, and third embodiments can be respectively converted into computer-readable codes of a computer-readable recording medium. The computer-readable recording medium may be any data storage device, and can be read by a computer system. For example, the computer-readable recording medium may be a read-only memory (ROM), random-access memory (RAM), CD-ROM, tape, soft disk, optical data storage device, and carrier wave (for example, data transmission over Internet).

In view of the above, the present invention ensures the QoS of the real-time and non-real-time services through the delay bound and soft delay bound. Thus, the QoS criterion is strictly constituted, such that for a real-time service, the delay bound thereof is not exceeded, and for a non-real-time service, a minimum reserved traffic rate thereof specified in the specification is maintained. Further, the design may be simplified by taking the common QoS criterion of both the real-time and non-real-time services into account. In addition, by adopting the concept of "user diversity", under the precondition of keeping the QoS, users transmitted efficiently are supported in priority, so as to improve the transmission output of the overall system, reduce the transmission time, and accommodate more users. Therefore, by taking both the QoS and transmission efficiency into account, the system can achieve a better transmission efficiency while keeping the QoS thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for scheduling packets to be transmitted, wherein the packets comprise a plurality of real-time packets and a plurality of non-real-time packets, the system comprising:
    a soft delay bound calculator module, configured to calculate a soft delay bound for each of the non-real-time packets based on a packet size of the non-real-time packet and a minimum reserved traffic rate of a channel; and
    a flame determination module, configured to determine whether a real-time packet must be transmitted at a current frame according to a delay bound, a transmission time, and a possible retransmission time thereof, and whether a non-real-time packet must be transmitted at a current frame according to a soft delay bound, a transmission time, and a possible retransmission time thereof,
    wherein the soft delay bound of each of the non-real-time packets is calculated by dividing the packet size of the non-real-time packet by the minimum reserved traffic rate;
    an available resource determination module, configured to determine whether the current frame comprises any available resource for transmitting other packets;
    a packet grouping module, configured to sequentially group the other packets into a plurality of groups according to the delay bounds or soft delay bounds of the packets; and
    a packet selection module, configured to select at least one packet from the groups according to a transmission efficiency of the other packets, so as to schedule the packets at the current frame,
    wherein a transmission efficiency of each packet is calculated using a difference of a result of dividing the packet size thereof by an estimated data amount per resource unit minus a result of dividing the packet size thereof by a least data amount per resource unit.

2. The system for scheduling packets to be transmitted according to claim 1, wherein a different number of the packets is selected from each group.

3. A method for scheduling packets of a wireless communication device to be transmitted, the method comprising:
    providing a plurality of packets to be transmitted by the wireless communication device, wherein the packets comprise a plurality of real-time packets and a plurality of non-real-time packets;
    determining whether a real-time packet must be transmitted at a current frame by the wireless communication device according to a delay bound, a transmission time, and a possible retransmission time thereof;
    calculating a soft delay bound for each of the non-real-time packets based on a packet size of the non-real-time packet and a minimum reserved traffic rate of a channel by the wireless communication device; and
    determining whether a non-real-time packet must be transmitted at the current frame by the wireless communication device according to a soft delay bound, a transmission time, and a possible retransmission time thereof, wherein the soft delay bound of each of the non-real-time packets is calculated by dividing the packet size of the non-real-time packet by the minimum reserved traffic rate;

determining whether the current frame comprises any available resource for transmitting other packets, if the current frame still comprises an available resource, sequentially grouping the other packets into a plurality of groups according to the delay bounds or soft delay bounds of the packets, and selecting at least one packet from each of the groups according to a transmission efficiency thereof, so as to schedule the selected packets at the current frame, wherein a transmission efficiency of each packet is calculated using a difference of a result of dividing the packet size by an estimated data amount per resource unit minus a result of dividing the packet size by a least data amount per resource unit.

4. The method for scheduling packets of the wireless communication device to be transmitted according to claim 3, wherein a different number of the packets is selected from each group.

5. A non-transitory computer-rendable recording medium, provided with a computer program for performing a method for scheduling packets to be transmitted, the method comprising:

providing a plurality of packets to be transmitted, wherein the packets comprise a plurality of real-time packets and a plurality of non-real-time packets;

determining whether a real-time packet must be transmitted at a current frame according to a delay bound, a transmission time, and a possible retransmission time thereof;

calculating a soft delay bound for each of the non-real-time packets based on a packet size of the non-real-time packet and a minimum reserved traffic rate of a channel; and determining whether a non-real-time packet must be transmitted at the current frame according to a soft delay bound, a transmission time, and a possible retransmission time thereof, wherein the soft delay bound of each of the non-real-time packets is calculated by dividing the packet size of the non-real-time packet by the minimum reserved traffic rate;

determining whether the current frame comprises any available resource for transmitting other packets, if the current frame still comprises an available resource, sequentially grouping the other packets into a plurality of groups according to the delay bound or soft delay bound of each packet, and selecting at least one packet from each of the groups according to a transmission efficiency thereof, so as to schedule the selected packets at the current frame, wherein a transmission efficiency of each packet is calculated using a difference of a result of dividing the packet size by an estimated data amount per resource unit minus a result of dividing the packet size by a least data amount per resource unit.

6. The non-transitory computer-readable recording medium according to claim 5, wherein a different number of the packets is selected from each group.

7. A system for scheduling packets to be transmitted, wherein the packets comprise a plurality of real-time packets and a plurality of non-real-time packets, the system comprising:

a soft delay bound calculator module, configured to calculate a soft delay bound for each of the non-real-time packets based on a packet size of the non-real-time packet and a minimum reserved traffic rate of a channel;

a packet grouping module, configured to sequentially group the packets into a plurality of groups according to the delay bound of each of the real-time packets and the soft delay bound of each of the non-real-time packets; and a packet selection module, configured to select at least one packet from each of the groups according to a transmission efficiency thereof, so as to schedule the selected packets at the current frame, wherein the soft delay bound of each of the non-real-time packets is calculated by dividing the packet size of the non-real-time packet by the minimum reserved traffic rate, wherein a transmission efficiency of each packet is calculated using a difference of a result of dividing the packet size by an estimated data amount per resource unit minus a result of dividing the packet size by a least data amount per resource unit.

8. The system for scheduling packets to be transmitted according to claim 7, wherein a different number of the packets is selected from each group.

9. A method for scheduling packets of a wireless communication device to be transmitted, comprising:

providing a plurality of packets to be transmitted by the wireless communication device, wherein the packets comprise a plurality of real-time packets and a plurality of non-real-time packets;

calculating a soft delay bound for each of the non-real-time packets based on a packet size of the non-real-time packet and a minimum reserved traffic rate of a channel by the wireless communication device; and sequentially grouping the packets into a plurality of groups according to the delay bound of each of the real-time packets and the soft delay bound of each of the non-real-time packets, and selecting at least one packet from each of the groups according to a transmission efficiency thereof, so as to schedule the selected packets at the current frame by the wireless communication device, wherein the soft delay bound of each of the non-real-time packets is calculated by dividing the packet size of the non-real-time packet by the minimum reserved traffic rate, wherein a transmission efficiency of each packet is calculated using a difference of a result of dividing the packet size by an estimated data amount per resource unit minus a result of dividing the packet size by a least data amount per resource unit.

10. The method for scheduling packets of the wireless communication device to be transmitted according to claim 9, wherein a different number of the packets is selected from each group.

11. A non-transitory computer-readable recording medium, provided with a computer program for performing a method for scheduling packets to be transmitted, the method comprising:

providing a plurality of packets to be transmitted, wherein the packets comprise a plurality of real-time packets and a plurality of non-real-time packets;

calculating a soft delay bound for each of the non-real-time packets based on a packet size of the non-real-time packet and a minimum reserved traffic rate of a channel; and sequentially grouping the packets into a plurality of groups according to the delay bound of each of the real-time packets and the soft delay bound of each of the non-real-time packets, and selecting at least one packet from each of the groups according to a transmission efficiency thereof, so as to schedule the selected packets at the current frame, wherein the soft delay bound of each of the non-real-time packets is calculated by dividing the packet size of the non-real-time packet by the minimum reserved traffic rate, wherein a transmission efficiency of each packet is calculated using a difference of a result of dividing the packet size by an estimated data amount per resource unit minus a result of dividing the packet size by a least data amount per resource unit.

12. The non-transitory computer-readable recording medium according to claim 11, wherein a different number of the packets is selected from each group.

* * * * *